US010730530B2

(12) United States Patent
Shannon et al.

(10) Patent No.: US 10,730,530 B2
(45) Date of Patent: *Aug. 4, 2020

(54) CONTEXTUAL AUTONOMOUS VEHICLE SUPPORT THROUGH SPEECH INTERACTION

(71) Applicant: GM GLOBAL TECHNOLOGY OPERATIONS LLC, Detroit, MI (US)

(72) Inventors: Jacqueline Mary Shannon, San Francisco, CA (US); Stephanie Olivia Engle, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/729,327

(22) Filed: Dec. 28, 2019

(65) Prior Publication Data

US 2020/0156659 A1    May 21, 2020

Related U.S. Application Data

(63) Continuation of application No. 16/192,532, filed on Nov. 15, 2018, now Pat. No. 10,562,541.

(51) Int. Cl.
*B60W 50/14* (2020.01)
*G10L 15/22* (2006.01)
(Continued)

(52) U.S. Cl.
CPC ........... *B60W 50/14* (2013.01); *B60K 35/00* (2013.01); *G05D 1/0088* (2013.01); *G06F 3/167* (2013.01);
(Continued)

(58) Field of Classification Search
CPC .................................................. B60W 50/14
See application file for complete search history.

(56) References Cited

U.S. PATENT DOCUMENTS 6,145,751 A   11/2000 Ahmed
7,177,815 B2   2/2007 Ehlen et al.
(Continued)

FOREIGN PATENT DOCUMENTS

CN   202798776 U   3/2013

OTHER PUBLICATIONS

"Non-Final Office Action for U.S. Appl. No. 16/192,532", dated Nov. 6, 2019, 15 Pages.
(Continued)

*Primary Examiner* — Nabil H Syed
*Assistant Examiner* — Cal J Eustaquio
(74) *Attorney, Agent, or Firm* — Medley, Behrens & Lewis, LLC

(57) ABSTRACT

An autonomous vehicle including a sensor system that outputs a sensor signal indicative of a condition of the autonomous vehicle. The vehicle also includes a communication system including a speaker. Based upon a profile of the passenger, the autonomous vehicle can determine that support is to be provided audibly to the passenger when the support is provided to the passenger. Moreover, the autonomous vehicle can detect occurrence of an event that has been identified as potentially causing discomfort to the passenger based upon the sensor signal output by the sensor system. Responsive to detecting the occurrence of the event, and in accordance with the profile of the passenger, the autonomous vehicle can cause the speaker to output an audible support message. Content of the audible support message is based on the detected event, and the audible support message solicits feedback from the passenger of the autonomous vehicle.

20 Claims, 8 Drawing Sheets

(51) Int. Cl.
 *G05D 1/00* (2006.01)
 *B60K 35/00* (2006.01)
 *G06F 3/16* (2006.01)
(52) U.S. Cl.
 CPC ........ *G10L 15/22* (2013.01); *B60K 2370/148* (2019.05); *B60K 2370/15* (2019.05); *B60K 2370/739* (2019.05); *B60W 2050/143* (2013.01); *G10L 2015/223* (2013.01)

(56) References Cited

U.S. PATENT DOCUMENTS

| | | | |
|---|---|---|---|
| 2007/0233341 A1* | 10/2007 | Logsdon | G07C 5/008 701/31.5 |
| 2010/0019925 A1 | 1/2010 | Biondo et al. | |
| 2017/0217445 A1 | 8/2017 | Tzirkel-Hancock et al. | |
| 2017/0330044 A1 | 11/2017 | Telpaz et al. | |
| 2017/0349027 A1 | 12/2017 | Goldman-Shenhar et al. | |
| 2018/0309711 A1 | 10/2018 | Woo et al. | |

OTHER PUBLICATIONS

"Response to the Non-Final Office Action for U.S. Appl. No. 16/192,532", filed Nov. 14, 2019, 10 Pages.
"Notice of Allowance and Fees Due for U.S. Appl. No. 16/192,532", dated Nov. 27, 2019, 10 Pages.

* cited by examiner

CONTEXTUAL AUTONOMOUS VEHICLE SUPPORT THROUGH SPEECH INTERACTION

CROSS-REFERENCE TO RELATED APPLICATION

This application is a continuation of U.S. patent application Ser. No. 16/192,532, filed on Nov. 15, 2018, and entitled "CONTEXTUAL AUTONOMOUS VEHICLE SUPPORT THROUGH SPEECH INTERACTION", the entirety of which is incorporated herein by reference.

BACKGROUND

An autonomous vehicle is a motorized vehicle that can operate without a human driver. Conventionally, since the autonomous vehicle lacks a driver, physical human-machine interfaces (HMIs) may be provided inside the autonomous vehicle to allow the passenger to request support during a ride. Exemplary HMIs include a mechanical push-button, a touch-sensitive display, or the like. While such HMIs are well-suited for a large portion of the population, these HMIs may be sub-optimal for those with vision impairments, as a person with a visual impairment may have difficulty trying to locate an HMI to ask for assistance while the autonomous vehicle is moving, much less type out a request for service. Additionally, a visually-impaired passenger may have difficulty providing an informed support request because they may not be able to determine what is occurring in the autonomous vehicle and/or the environment exterior of the autonomous vehicle.

SUMMARY

The following is a brief summary of subject matter that is described in greater detail herein. This summary is not intended to be limiting as to scope of the claims.

Described herein are various technologies pertaining to providing support messages to a visually impaired passenger of an autonomous vehicle. With more specificity, the various technologies present a support message to the passenger based on a profile of the passenger, wherein the profile of the passenger specifies that the support message is to be provided audibly to the passenger (e.g., the passenger may have a visual impairment). With yet more specificity, the various technologies present the support message when an event that has been identified as potentially causing discomfort to the passenger has been detected. Content of the support message is based on the type of event and is designed to elicit feedback from the passenger. Because the content of the support message is based on the type of event occurring, the support message can inform the visually impaired passenger of the reason for the event. For instance, where the autonomous vehicle comes to a hard stop (e.g., has an observed deceleration that is above a threshold), the support message can include "the car stopped because an animal ran into the road."

In one example, the autonomous vehicle includes a sensor system that outputs a sensor signal that is indicative of a condition of the autonomous vehicle and a communication system that includes a speaker. A computing system in the autonomous vehicle detects occurrence of the event based on the sensor signal output from the sensor system. The computing system is then configured to cause the speaker in the autonomous vehicle to output the audible support message. The autonomous vehicle can further include a microphone that receives feedback from the passenger in response to the support message.

In another example, a mobile computing device operated by a passenger of the autonomous vehicle acts as an interface for presenting support message(s) and receiving feedback. The mobile computing device receives data from the autonomous vehicle specifying the support message to be presented to the passenger. Responsive to receiving the data, the mobile computing device presents the audible support message to the passenger by way of a speaker in the mobile computing device. The mobile computing device receives feedback from the passenger by way of microphone in the device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
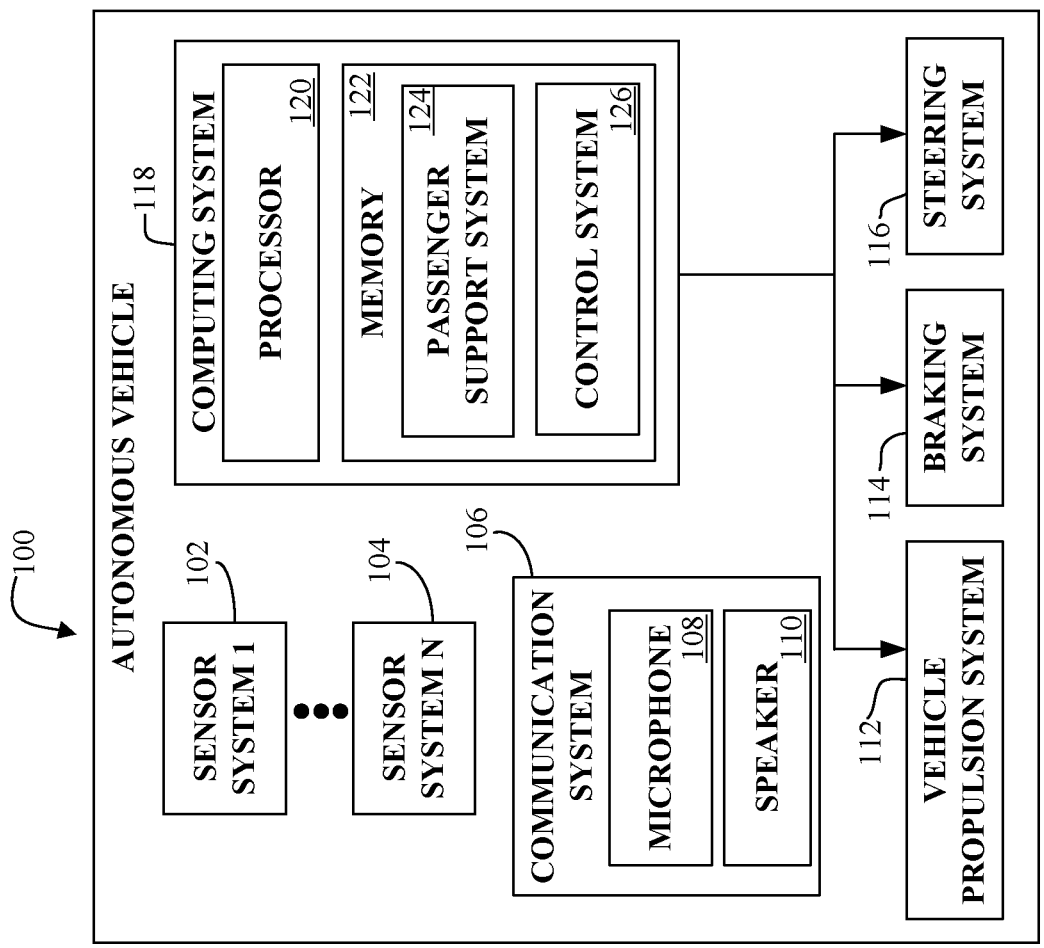
FIG. 1 illustrates an exemplary autonomous vehicle.

Various technologies pertaining to an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Disclosed are various technologies that are particularly well-suited for use when a passenger of an autonomous vehicle has a vision impairment. More specifically, a computer-readable profile of a passenger can indicate that the passenger prefers to receive a support message(s) audibly. When an event is detected that may cause the passenger to be uncomfortable when riding in the autonomous vehicle (such as an atypically quick stop, abnormally fast or slow acceleration, remaining stationary for longer than the passenger may expect), the autonomous vehicle can cause an audible support message to be presented to the passenger. The support message may ask the passenger whether support is desired, inform the passenger of circumstances that caused the event, and so forth. Hence, the passenger (who may be visually impaired) need not attempt to initiate support by interacting with a physical human-machine interface (HMI).

Accordingly, sensed events on a trip in an autonomous vehicle can trigger spoken interaction with support for a passenger who has a visual impairment. While the techniques set forth herein are described for use with passengers having visual impairments, it is to be appreciated that these techniques can be utilized to assist passengers having other types of disabilities; thus, as noted herein, personalization settings in a profile of a passenger can indicate a preference for spoken communication for contextual support that is triggered based on detected events occurring when the passenger is in the autonomous vehicle. Moreover, different sensed events, for instance, can trigger different types of spoken interaction (e.g., a first type of sensed event can trigger an audible support message to be presented to the passenger while a second type of sensed event can trigger establishing a voice communication channel to enable the passenger to speak with a support agent). Pursuant to an illustration, a hard stop in an autonomous vehicle can trigger spoken interaction with support for a passenger in the autonomous vehicle without being initiated by the passenger.

Generally, an autonomous vehicle includes a display screen located in an interior of the autonomous vehicle that can be configured to receive typed-out support requests and provide support information. However, where the passenger is visually-impaired it can be difficult for the passenger to operate the display screen to request support, much less read the support information while the autonomous vehicle is moving. Thus, it may be preferable for the passenger to receive audible support. The disclosed methods and systems can be integrated with an autonomous vehicle to provide contextual audible support messages.

With reference now to FIG. 1, an exemplary autonomous vehicle 100 is illustrated. The autonomous vehicle 100 can navigate about roadways without a human driver based upon sensor signals output by sensor systems of the autonomous vehicle 100. The autonomous vehicle 100 includes a plurality of sensor systems, namely, a sensor system 1 102, . . . , and a sensor system N 104 (collectively referred to herein as sensor systems 102-104). The sensor systems 102-104 are of different types and may be arranged about the autonomous vehicle 100. For example, the sensor system 1 102 may be a lidar sensor system and the sensor system N 104 may be a camera (image) system. Other exemplary sensor systems that may be included in the sensor systems comprise a radar sensor system, a GPS sensor system, a sonar sensor system, an infrared sensor system, and the like.

The autonomous vehicle 100 further includes several mechanical systems that are used to effectuate appropriate motion of the autonomous vehicle 100. For instance, the mechanical systems can include, but are not limited to, a vehicle propulsion system 112, a braking system 114, and a steering system 116. The vehicle propulsion system 112 may be or include an electric motor, an internal combustion motor, or the like. The braking system 114 can include an engine brake, brake pads, actuators, and/or any other suitable componentry that is configured to assist in decelerating the autonomous vehicle 100. The steering system 116 includes suitable componentry that is configured to control the direction of the movement of the autonomous vehicle 100.

The autonomous vehicle 100 yet further includes a communication system 106 that may be configured for use by a passenger of the autonomous vehicle 100. The communication system 106 includes a microphone 108 configured to receive audio data, including speech input from the passenger. The speech input from the passenger can include any vocal sound made by the passenger, such as words, phrases, a groan, etc. The communication system 106 further includes a speaker 110 configured to emit sound. The speaker 110 can be located in any position in the autonomous vehicle 100 suitable for the sound reaching the passenger. For example, the communication system 106 can comprise a network of speakers located around an interior of the autonomous vehicle 100.

The autonomous vehicle 100 additionally comprises a computing system 118 that is in communication with the sensor systems 102-104, the communication system 106, the vehicle propulsion system 112, the braking system 114, and/or the steering system 116. The computing system 118 includes a processor 120 and memory 122, where the memory stores computer-executable instructions that are executed by the processor 120. In an example, the processor 120 can be or include a graphics processing unit (GPU), a plurality of GPUs, a central processing unit (CPU), a plurality of CPUs, an application-specific integrated circuit (ASIC), a microcontroller, or the like.

The memory 122 includes a control system 126 configured to control operation of the vehicle propulsion system 112, the braking system 114, and/or the steering system 116 based upon outputs of the sensor systems 102-104. The memory 122 further includes a passenger support system 124 that may be configured to provide support to the passenger riding in the autonomous vehicle 100. More particularly, the passenger support system 124 can provide audible support messages when an event is detected that may cause the passenger to be uncomfortable when riding in the autonomous vehicle.

With respect to the passenger of the autonomous vehicle 100, the passenger support system 124 is configured to receive preference data for the passenger that is stored in a computer-readable profile of the passenger. The preference data indicates that: 1) support is to be initiated for the passenger upon detection of an event that may cause the passenger discomfort; and 2) that the support is to be conducted audibly. In an example, the passenger may have a visual impairment, and the passenger can define the preference data in his or her profile.

While the passenger is in the autonomous vehicle 100, the passenger support system 124 is configured to detect an event based upon sensor signals output by the sensor systems 102-104, wherein the event is previously identified as potentially causing discomfort to passengers of the autonomous vehicles 100 (and specifically passengers identified as having a visual impairment). Exemplary events that can be detected by the passenger support system 124 include, but are not limited to, a hard stop (e.g., deceleration above a threshold), a sudden turn (e.g., radial velocity above a threshold), a traffic jam (e.g., velocity below a threshold velocity for an extended threshold period of time), and so forth.

Responsive to the passenger support system 124 detecting such an event, the passenger support system 124 is configured to cause the speaker 110 to emit an audible support message (in accordance with the preferences of the passenger), as will be described in detail below. The support message can include a prompt for response, may be informative as to the detected event, may include instructions for the passenger to follow, and so forth. Exemplary operation of the passenger support system 124 is set forth below.

The autonomous vehicle 100 may suddenly stop (e.g., due to an animal running in front of the autonomous vehicle 100). The sensor systems 102-104 output sensor signals that indicate the autonomous vehicle 100 has suddenly stopped (e.g., deceleration is above a threshold). The passenger support system 124 determines that the event (the sudden stop) has occurred based upon the sensor signals, and causes the speaker 110 to audibly emit a support message, such as "are you alright", "do you want to get out of the vehicle", "everything is ok, an animal jumped in front of the vehicle", "would you like to speak with someone", and so forth. Hence, support is automatically initiated for the passenger, and the passenger need not search the autonomous vehicle 100 for a physical human-machine interface (HMI) to receive support.

In another example, the sensor system 102-104 can output sensor signals that indicate that the autonomous vehicle 100 has not moved for a relatively significant amount of time (e.g., three minutes). The passenger support system 124 detects that the autonomous vehicle 100 has not moved based upon the sensor signals and causes the speaker 110 to emit an audible support message in accordance with the profile of the passenger. Again, such support message can be a prompt for the passenger, may be informative as to the detected event, etc. For instance, the support message may be "we are in a traffic jam that is expected to clear up in ten minutes", "we are in a traffic jam, your destination is a five minute walk from here—would you like to get out", "we are in a traffic jam, is the temperature alright in the vehicle", and so forth. Again, the passenger support system 124 is particularly well-suited for passengers with visual impairments, as they may be unable to perceive the event visually, and further as they are provided with support in a manner that is readily comprehended.

Once support is initiated, the passenger may set forth verbal commands, which are captured by the microphone 108 and provided to the passenger support system 124. The passenger support system 124 can then provide support in accordance with the verbal commands and it may set forth additional (audible) support messages based on those commands, etc.

Figure 2:
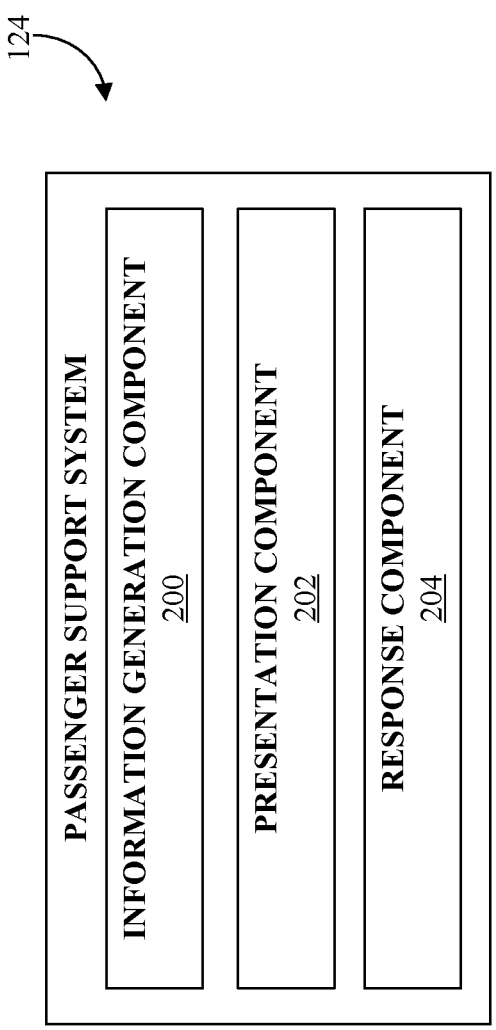
FIG. 2 is a functional block diagram of a passenger support system.

As shown in FIG. 2, the passenger support system 124 includes an information generation component 200, a presentation component 202, and/or a response component 204.

The information generation component 200 is configured to receive status data signifying a physical condition of the autonomous vehicle 100 based upon sensor signals output by the sensor systems 102-104. The information generation component 200 is further configured to generate information data when the information generation component 200 detects an event based on the status data, the event being previously identified as potentially causing discomfort to passengers of autonomous vehicles 100. The information generation component 200 is yet further configured to transmit the information data to the presentation component 202.

The status data can include velocity of the autonomous vehicle 100, direction of the autonomous vehicle 100, elevation of the autonomous vehicle 100, location of the autonomous vehicle 100, or the like. The status data can further include present physical condition of the autonomous vehicle 100, physical conditions of the autonomous vehicle 100 over a period of time, a historical physical condition of the autonomous vehicle 100, or the like. For example, the status data can signify a current velocity of the autonomous vehicle 100. In another example, where the status data includes physical conditions of the autonomous vehicle 100 over a period of time, the event data can signify the rate of change in velocity of the autonomous vehicle 100 during that period of time.

The presentation component 202 can, responsive to receipt of the information data from the information generation component 200, provide a support message to the passenger of the autonomous vehicle 100 based on receipt of the information data. In one embodiment, content of the support message is based on the type of event that has occurred or is occurring as signified by the information data.

The presentation component 202 presents the content of the support message to the passenger in the manner specified by the passenger in the received preference data. In the following embodiments, the preference of the passenger is to present the support message audibly. In one embodiment, the presentation component 202 is configured to present the support message to the passenger by way of the speaker 110 of the communication system 106.

The number of audible support messages presented to the passenger may depend upon the event detected. For instance, where the event is a car accident (e.g., fender bender), a plurality of different audible support messages may be presented. Whereas, where the event is a short stop (e.g., a deceleration rate above a certain threshold), a single audible support message may be presented.

The content of the support message can include a word, a number, a phrase, or any combination thereof. The content of the support message emitted via the speaker 110 may be indicative of possible content the passenger would vocalize while requesting support. For example, the content of the support message can comprise the word "stop." In another example, the content of the support message can comprise the phrase "do you need assistance?"

The content of the support message(s) can be further configured to elicit an input (e.g., a vocal command) from the passenger. For example, the content can comprise a question or a request for a passenger to select a support message from amongst a plurality of different support messages. In one example, the content of the support message comprises a question, such as "are you ok?" In another example, the content of the support message comprises different choices, such as "If you are hurt, say one. If you need assistance, say two. If you are ok, say three."

In one example, the presentation component 202 may be further configured to present a support message with content that covers a plurality of different physical conditions indicated by the received information data. For example, the content of the support message can include the phrase "are you ok?" or "do you feel safe?" The presentation component 202 may be configured to present this support message when the received information data indicates a velocity change rate above a certain threshold (e.g., a hard stop), an elevation change rate above a certain threshold (e.g. went down a steep hill), a direction change rate above a certain threshold (e.g., a sudden swerve), and/or any situation where the autonomous vehicle 100 makes a sudden maneuver.

In yet another example, the presentation component 202 may be configured to present a support message with different choices each configured to elicit a different input (e.g., a vocal command from the passenger) signifying their selection. For instance, the content of the support message can comprise "if you need assistance, say one; if you are injured, say two; to speak to an operator, say three; to stop the autonomous vehicle, say four; to repeat the messages, say five." The passenger can then provide a specific input signifying selection of one of the choices presented.

The response component 204 can be configured to receive the input from the passenger. The input from the passenger can be made responsive to a support message(s) being presented to the passenger or can be made independent of a support message being presented. In an embodiment, the input comprises audible commands made by the passenger. In an embodiment, the microphone 108 is configured to capture the vocal sounds set forth by the passenger.

Each support message presented may be configured to elicit a unique input from the passenger. Where a plurality of different support messages are presented to the passenger, the passenger may provide input in response to one or more of the plurality of different support messages as desired.

The response component 204 may be further configured, reactive to receipt of the input from the passenger, to provide a response support message for the passenger. In one embodiment, the response component 204 may be further configured to present one or more response support messages to the passenger. Similar to the presentation component 202, described above, the response component 204 may be configured to present the response support message to the passenger according to the received passenger preference. In this instance, the preference of the passenger is audible response support messages.

The content of the response support message can be based on the vocal command from the passenger. For instance, the response support message can provide an answer to a question from the passenger. In another embodiment, the response support message is configured to elicit an input (e.g., a vocal command) from the passenger. The response component 204 may then provide a subsequent response support message in response to this input. For instance, the response component 204 can present consecutive response support messages that act as a questionnaire, where each successive response support message is based on the input received for the prior presented response support message. Each response support message can include one or more choices and the choice the passenger selects either progresses or ends the questionnaire.

The response component 204 may be yet further configured to transmit response data to the control system 128 to control the autonomous vehicle 100. The response data can indicate input from the passenger of a desire to change operation of the autonomous vehicle 100. For instance, the emitted audible support message can say "STOP" or "STOP CAR" and the passenger provides a vocal command (input) in response when the passenger wants the autonomous vehicle 100 to pull over and stop directional movement.

Figure 3:
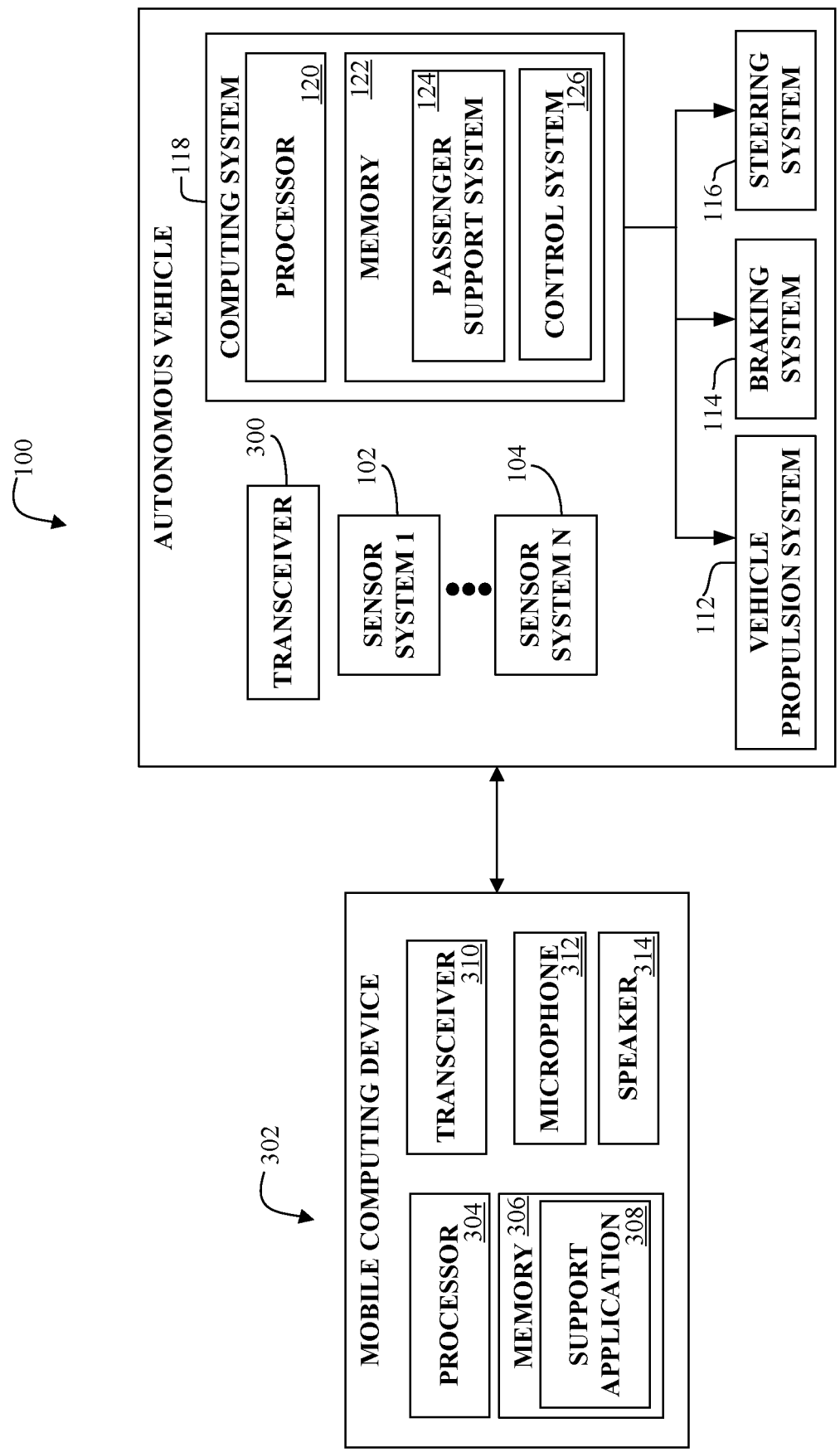
FIG. 3 illustrates an exemplary autonomous vehicle in communication with a mobile computing device.

In another embodiment, illustrated in FIG. 3, the passenger support system 124 is configured to present the support message(s) by way of a mobile computing device 302 (e.g., a telephone or wearable computing device) operated by the passenger. The autonomous vehicle 100 may include a transceiver 300. The transceiver 300 is configured to transmit data from the autonomous vehicle 100 and/or receive data at the autonomous vehicle 100. Thus, the autonomous vehicle 100 can exchange data with the mobile computing device 302 by way of a network.

Illustrated in FIG. 3 is a functional block diagram of the mobile computing device 302. The mobile computing device 302 includes a transceiver 310. The transceiver 310 is configured to transmit data from the mobile computing device 302 and/or receive data at the mobile computing device 302. The mobile computing device 302 further includes a processor 304 and memory 306, wherein the memory 306 has a support application 308 loaded therein. The support application 308 may be configured to interface with the passenger support system 124 of the autonomous vehicle 100. The mobile computing device 302 yet further includes a speaker 314 and a microphone 312. The support application 308 can be configured to receive support message(s) generated by the passenger support system 124 via the transceiver 310. The support application 308 can be further configured to present these support message(s) to the passenger via the speaker 314 in the mobile computing device 302. The support application 308 can be yet further configured to receive vocal commands from the passenger via the microphone 312. Similar to the input described above with reference to the microphone 108 in the autonomous vehicle 100, the input received by the microphone 312 of the mobile computing device 302 can be made responsive to presentation of the support message(s) or independent thereof. The mobile computing device 302 is further configured to transmit data to the autonomous vehicle 100, via the transceiver 310, signifying input from the passenger.

Figure 4:
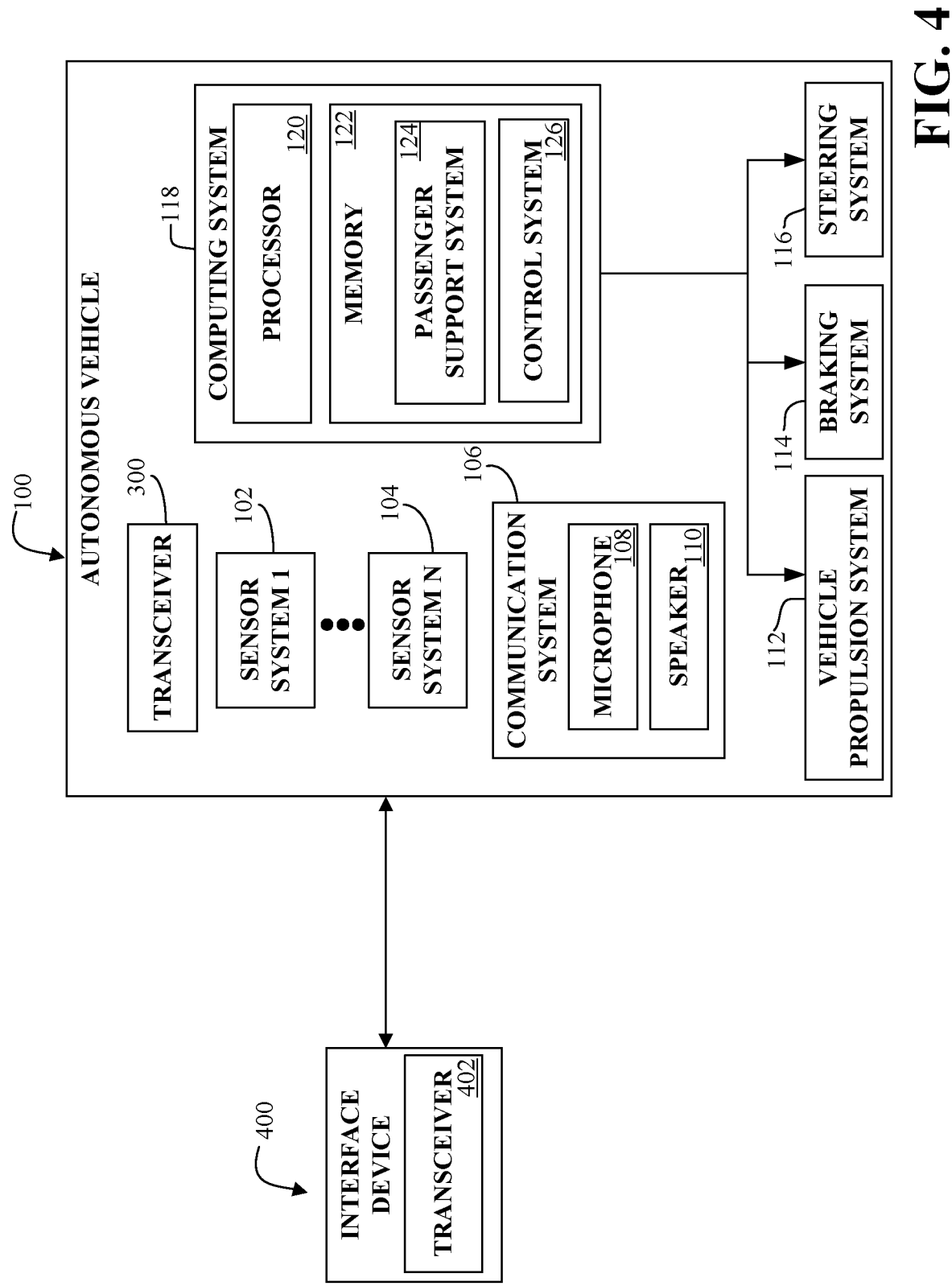
FIG. 4 illustrates an exemplary autonomous vehicle in communication with an interface device.

Turning now to FIG. 4, the passenger support system 124 may be further configured to establish a voice communication channel between the passenger and an interface device 400 operated by a support agent (e.g., a person who provides support to the passenger) to exchange voice data. The interface device 400 has an application installed on it that allows for the application and the passenger support system 124 to establish the voice communication channel. The passenger support system 124 may be further configured to receive messages transmitted from the interface device 400 via the voice communication channel.

The passenger support system 124 may be configured to additionally transmit an automated message based on the input from the passenger to the interface device 400 after establishing the voice communication channel. The automated message can be composed to provide the user with information regarding the input and/or response input from the passenger. The automated message can include the content from the chosen support message, content inputted by the passenger, and/or any suitable content configured to inform the user of the interface device 400.

In one embodiment, the response component 204 of the passenger support system 124 may be configured to establish the voice communication channel based on the content of the input from the passenger. For instance, the response component 204 establishes the voice communication channel when the passenger indicates they need assistance or want to chat. In another embodiment, the response component 204 may be configured to establish the voice communication channel independent of the content of the input from the passenger. For example, the response component 204 can be configured to automatically establish the telephonic communication channel when a certain event occurs (e.g. the autonomous vehicle 100 is involved in an accident). In another example, based on a preference of the passenger, the response component 204 can be configured to automatically establish the voice communication channel whenever the passenger says a trigger phrase.

In one embodiment, the voice communication channel is established with an interface device 400 operated by a support agent. In another embodiment, the passenger can be placed in communication with a digital assistant (in addition to or instead of the support agent). The passenger support system 124 may be configured to select a specific support agent (from a set of support agents) based on a user preference of the passenger. For example, where the passenger is visually-impaired, the user preference of the passenger may be for the user to have experience assisting the visually-impaired. Similar to the support message discussed above, the user preference of the passenger can be stored in a database in an account associated with the passenger and can be provided by any suitable source.

The passenger support system 124 may be configured to transmit further data in addition to the voice data from the autonomous vehicle 100 to the interface device 400. As shown in FIG. 4, in order to transmit the data, the transceiver 300 of the autonomous vehicle 100 may be further configured to exchange data with the interface device 400. Similarly, the interface device 400 includes a transceiver 402 configured to transmit data from the interface device 400 and/or receive data at the interface device 400. While not shown, it is contemplated that data can be exchanged between the autonomous vehicle 100 and the interface device 400 via various network components, nodes, etc. Moreover, the data may signify: the support message(s) presented; the response support message(s) presented, if any; the physical condition of the autonomous vehicle 100; and/or similar information related to the autonomous vehicle 100 and/or the passenger.

In an effort to prevent accidental triggering of the passenger support system 124 by the passenger, the passenger support system 124 can be further configured to determine passenger intention based on the input from the passenger. The passenger intention determined by passenger support system 124 signifies whether the input received was intentionally provided to trigger the response component 204. In one embodiment, the passenger intention is determined based on the tone of the vocal input from the passenger. By way of illustration, where the tone of the passenger when making the input is not serious (e.g. joking, sarcastic, etc.) the passenger support system 124 can determine that the passenger intention is not to trigger the response component 204.

By way of another illustration, the passenger support system 124 can use speech surrounding a trigger word to determine if the trigger word is intentionally provided. For instance, where the word "chat" is a trigger word the response component 204 to establish a telephonic communication channel and the microphone hears the passenger say "we need to have a chat" the passenger support system 124 can determine that the passenger's use of the word "chat" was not intended to cause the response component 204 to establish a telephonic communication channel.

By way of yet another illustration, the autonomous vehicle 100 can include an in-cabin camera configured to monitor an interior of the autonomous vehicle 100. The in-cabin camera can view the entire interior of the autonomous vehicle 100 and/or can focus on a specific passenger of the autonomous vehicle 100. The passenger support system 124 can be configured to consider images captured by the in-cabin camera at the time the microphone heard the passenger speak in order to determine passenger intention.

Where input from the passenger, comprising speech heard by the microphone, was not intentionally provided by the passenger to trigger the response component 204, the passenger support system 124 can prevent activation of the response component 204. Thus, the passenger support system 124 can prevent unintentional triggering of the response component 204.

Figure 5:
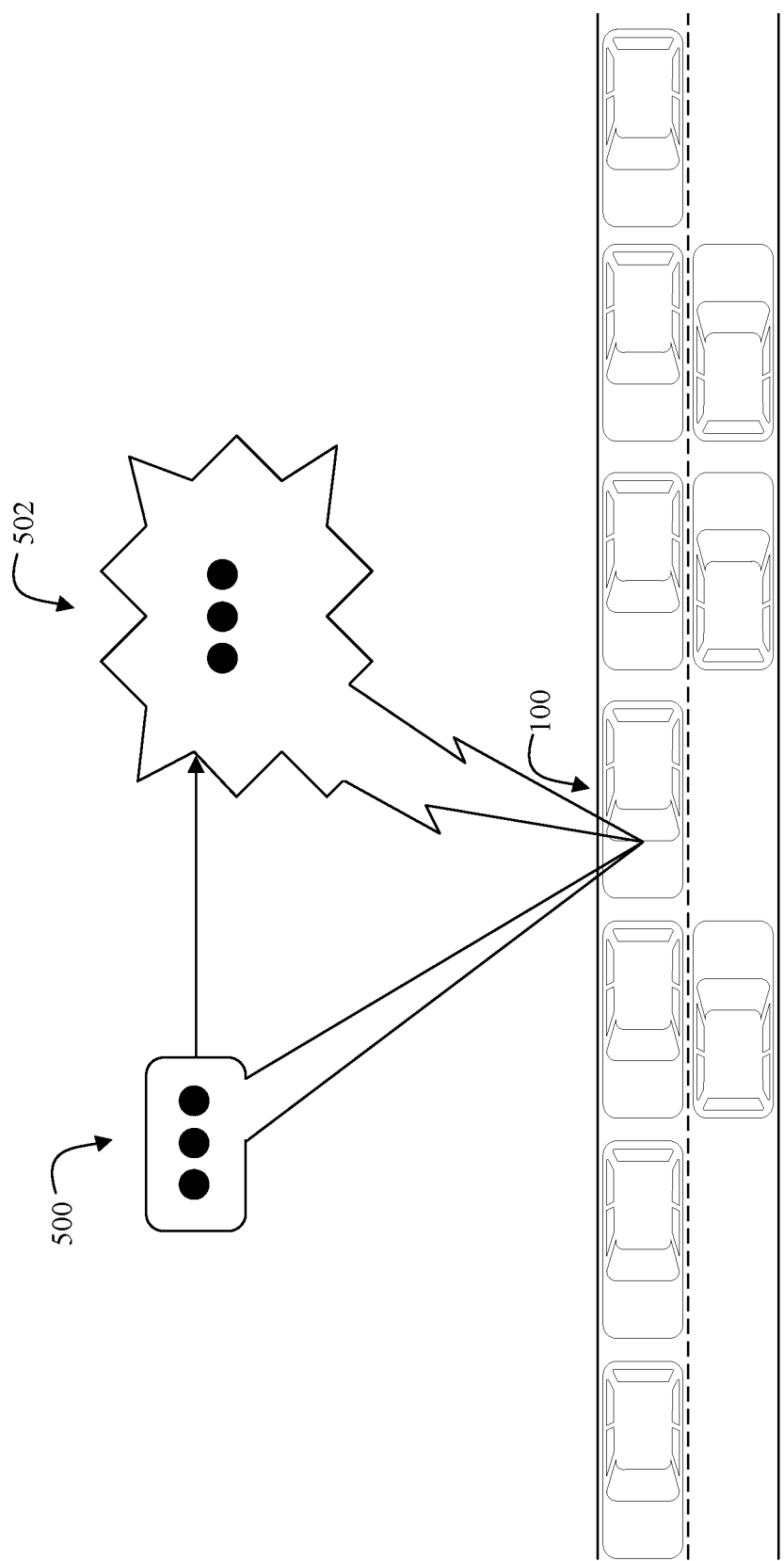
FIG. 5 illustrates an example of providing a support message to a passenger of an autonomous vehicle.
Figure 6:
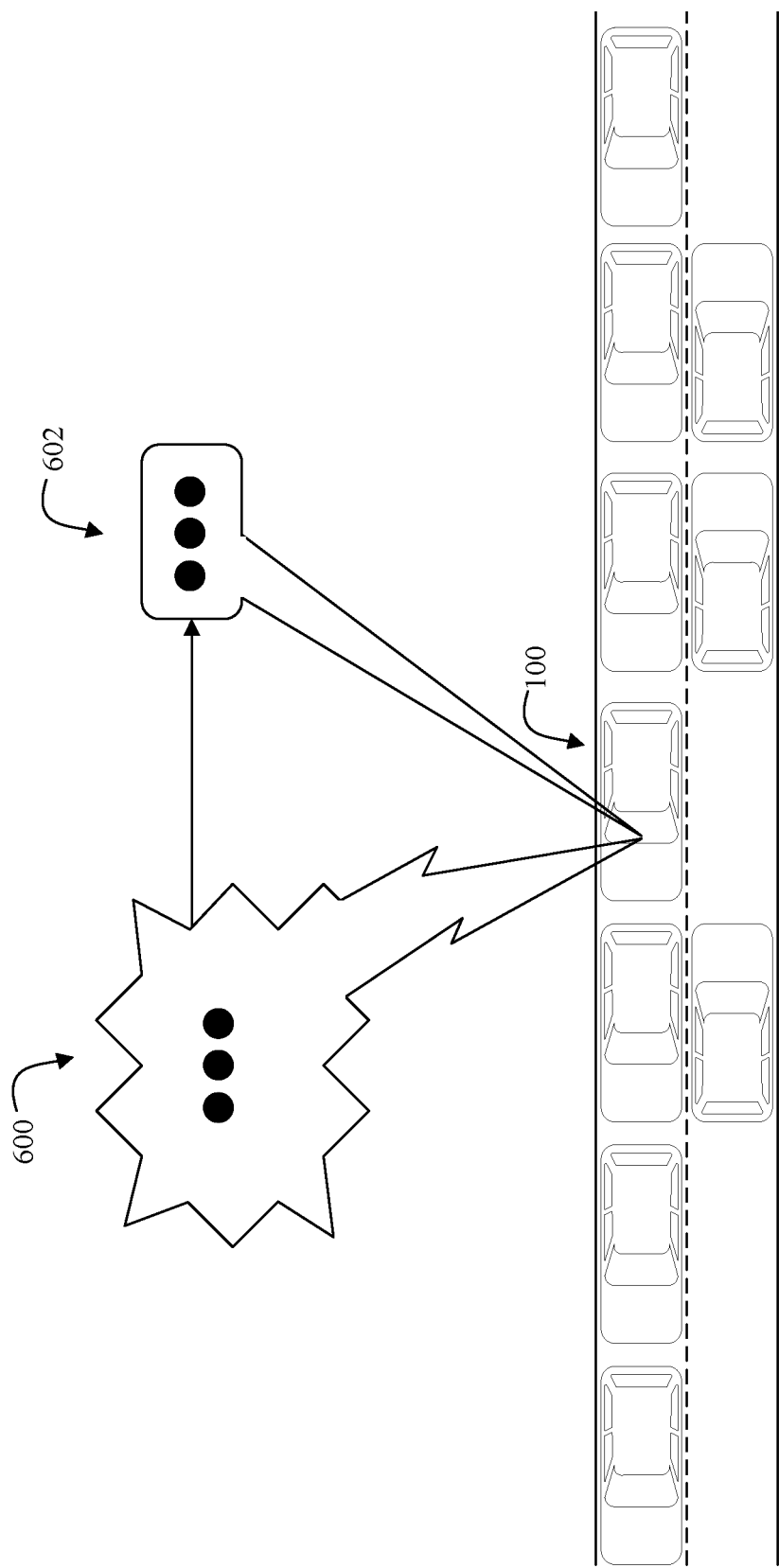
FIG. 6 illustrates another example of providing a support message to a passenger of an autonomous vehicle.

FIGS. 5 and 6 illustrate examples of the autonomous vehicle 100 described providing support to a passenger of the autonomous vehicle 100. FIGS. 5 and 6 illustrate the autonomous vehicle 100 sitting in traffic congestion. The information generation component 200 receives data from the sensor systems 102-104 signifying that the autonomous vehicle 100 has not moved for a set period of time.

In FIG. 5, the passenger provides a vocal command 500 via a microphone independent of receiving a support message. The passenger can state a trigger word or phrase configured to cause to the passenger support system 124 to perform a task. For instance, where the passenger states "please provide assistance" the passenger support system 124 can be configured to provide a response support message 502 with at least one choice selectable by the passenger. In another example, when the passenger states "help" the passenger support system 124 can be configured to establish a voice communication channel with the interface device 400, as described above. The passenger support system 124 can be further configured to inform the passenger, via a speaker, that a voice communication channel is being established.

In FIG. 6, the passenger support system 124 presents a support message 600 to the passenger via a speaker. The support message 600 presented can include such content as "do you need assistance" or any suitable language based on the received information data signifying the physical condition of the autonomous vehicle 100. The support message 600 can be triggered based on a sensed event on a trip in the autonomous vehicle 100. Moreover, the content of the support message 600 can be relevant to the sensed event detected during the trip that triggered the support message 600. The passenger can then provide an input 602 received by a microphone. The content of the input 602 can include "yes", "no", "what's going on?", or the like.

Figure 7:
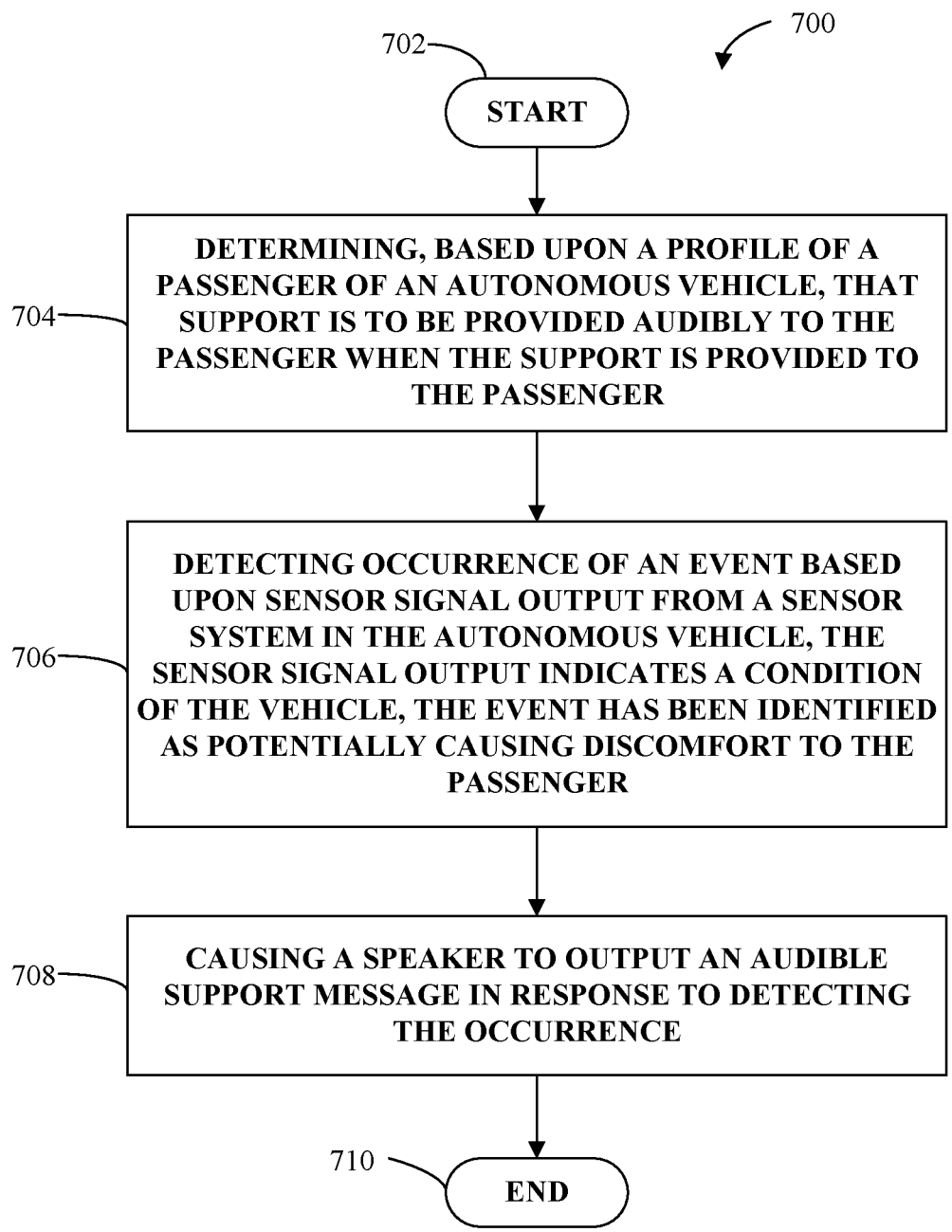
FIG. 7 is a flow diagram that illustrates an exemplary methodology executed by an autonomous vehicle computing system.

FIG. 7 illustrates an exemplary methodology relating to providing a support message for a passenger of an autonomous vehicle. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 7, an exemplary methodology 700 is illustrated. The methodology 700 starts at 702, and at 704, a processor determines, based upon a profile of a passenger of an autonomous vehicle, that support is to be provided audibly to the passenger when the support is provided to the passenger. At 706, the processor detects occurrence of an event based upon sensor signal output from a sensor system in the autonomous vehicle, wherein the event has been identified as potentially causing discomfort to the passenger. The sensor signal output indicates a condition of the autonomous vehicle, such as velocity, location, etc. At 708, responsive to detecting the occurrence of the event and in accordance with the profile of the passenger, the processor causes a speaker to output an audible support message. Content of the support message is based on the detected occurrence. The audible support message further solicits feedback from the passenger of the autonomous vehicle. Methodology 700 concludes at 710.

In an embodiment, the methodology 700 further includes receiving feedback (e.g., vocal command, answer, etc.) from the passenger and providing an audible response support message via the speaker in response. The content of the response support message is based on the received feedback. For instance, the content of the response support message may be an answer to a question from the passenger.

In another embodiment, the methodology 700 further includes receiving feedback from the passenger and establishing a voice communication channel between the autonomous vehicle and an interface device operated by a support agent. As described in the preceding paragraphs, the voice communication channel is configured to transmit voice data to and from the autonomous vehicle.

In yet another embodiment, the methodology 700 further includes transmitting the support message to a mobile computing device operated by the passenger. In this embodiment, the mobile computing device operates as an interface the passenger can use to hear the support message and/or to provide feedback. Here, the support message is presented by the speaker in the mobile computing device.

In an embodiment, where the event comprises a curvy road that may cause motion sickness (e.g., a threshold number of direction change rates above a second threshold), the support message can inform the passenger of the remaining number of expected direction change rates above a second threshold along a route to a destination and can ask the passenger if an alternative route is desired. In another embodiment, where the event comprises a traffic jam (e.g., velocity of the autonomous vehicle is below a threshold velocity for an extended threshold period of time), the support message can inform the passenger of the expected time for the traffic jam to clear up and the expected time it would take the passenger to walk to a destination if the passenger left the autonomous vehicle.

In a further embodiment, the methodology 700 further includes controlling the autonomous vehicle based on the received feedback. For instance, the processor can control the vehicle propulsion system, braking system, and/or steering system to adjust the autonomous vehicle (e.g., stopping to allow the passenger to exit).

Figure 8:
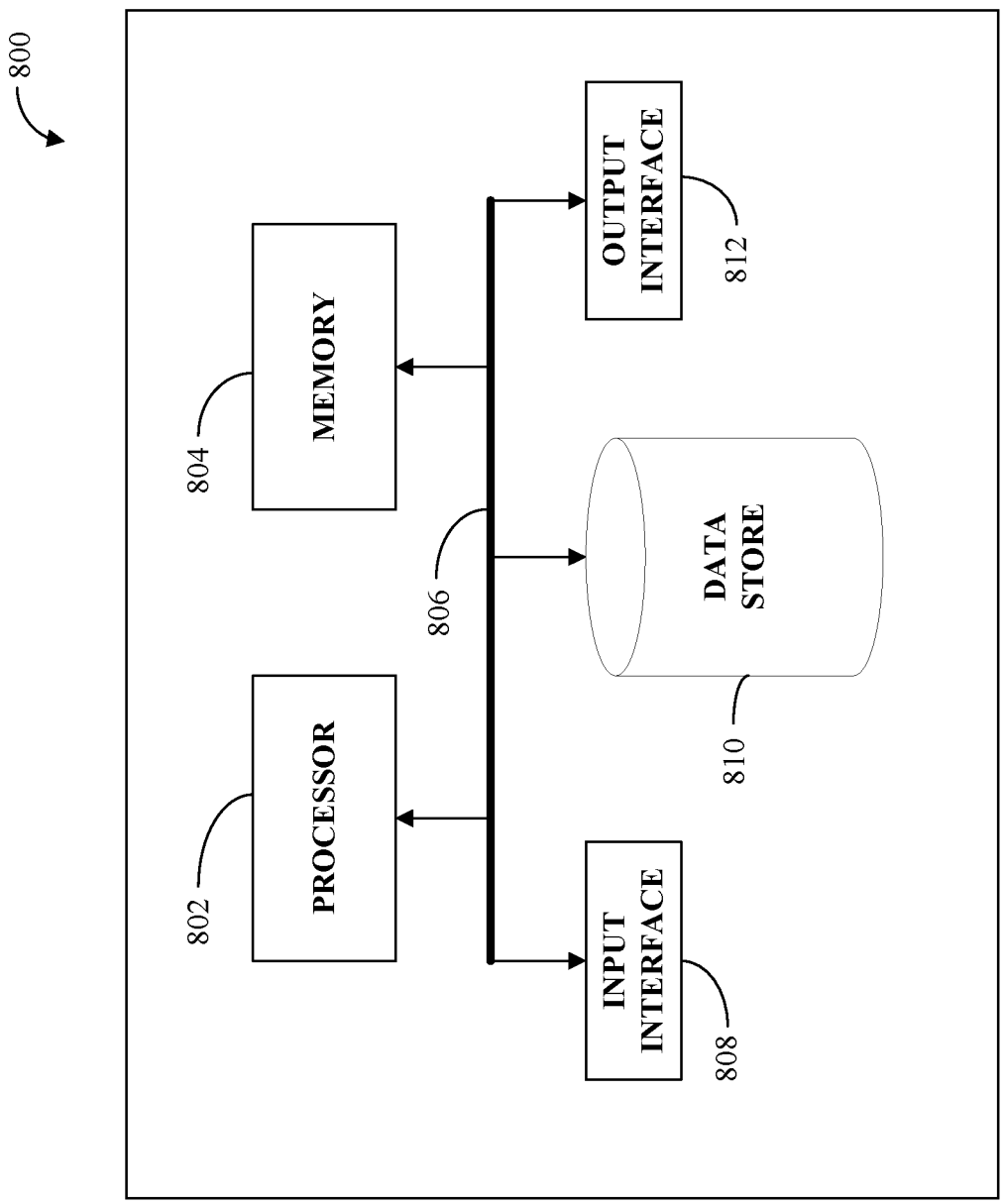
FIG. 8 illustrates an exemplary computing system.

Referring now to FIG. 8, a high-level illustration of an exemplary computing device that can be used in accordance with the systems and methodologies disclosed herein is illustrated. For instance, the computing device 800 may be or include the mobile computing device or the computing system. The computing device 800 includes at least one processor 802 that executes instructions that are stored in a memory 804. The instructions may be, for instance, instructions for implementing functionality described as being carried out by one or more components discussed above or instructions for implementing one or more methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store geolocation coordinates of suggested locations or landmarks, roadways, user identification, user preferences, etc.

The computing device 800 additionally includes a data store 810 that is accessible by the processor 802 by way of the system bus 806. The data store 810 may include executable instructions, geolocation coordinates of suggested locations or landmarks, roadways, user identification, user preferences, etc. The computing device 800 also includes an input interface 808 that allows external devices to communicate with the computing device 800. For instance, the input interface 808 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a vehicle propulsion system;
   a braking system;
   a steering system;
   a sensor system that is configured to output a sensor signal; and
   a computing system, comprising:
      a processor; and
      memory that stores computer-executable instructions that, when executed by the processor, cause the processor to perform acts comprising:
         detecting an occurrence of a type of an event during a ride of a passenger in the autonomous vehicle based on the sensor signal outputted by the sensor system;
         responsive to detecting the occurrence of the event, causing a speaker to output an audible support message that is contextually relevant to the type of the event, wherein the audible support message solicits feedback from the passenger of the autonomous vehicle; and
         responsive to receiving the feedback from the passenger, controlling at least one of the vehicle propulsion system, the braking system, or the steering system to control the autonomous vehicle based on the feedback.

2. The autonomous vehicle of claim 1, wherein the speaker is caused to output the audible support message based on a profile of the passenger, and wherein the profile of the passenger specifies that autonomous vehicle support for the passenger is to be effectuated using audible communication.

3. The autonomous vehicle of claim 1, the acts further comprising:
   selecting the audible support message based on the type of the event, wherein the audible support message is a predefined audible support message specified as being relevant to the type of the event.

4. The autonomous vehicle of claim 3, wherein a first predefined audible support message is predefined for a first event type, wherein a second predefined audible support message is predefined for a second event type, and wherein content of the first predefined audible support message is different from content of the second predefined audible support message.

5. The autonomous vehicle of claim 1, further comprising:
   a communication system configured for use by the passenger of the autonomous vehicle, wherein the communication system comprises the speaker that outputs the audible support message.

6. The autonomous vehicle of claim 1, wherein causing the speaker to output the audible support message further comprises causing a speaker of a mobile computing device operated by the passenger in the autonomous vehicle to output the audible support message.

7. The autonomous vehicle of claim 1, wherein the type of the event is predefined as potentially causing passenger discomfort.

8. The autonomous vehicle of claim 1, the acts further comprising:
   responsive to receiving the feedback from the passenger, causing the speaker to output an audible response support message, wherein content of the audible response support message is based on content of the feedback from the passenger.

9. The autonomous vehicle of claim 1, the acts further comprising:
   responsive to receiving the feedback from the passenger, establishing a voice communication channel between the autonomous vehicle and an interface device operated by a support agent.

10. The autonomous vehicle of claim 9, wherein an automated message is transmitted to the interface device operated by the support agent, the automated message comprises content of the feedback from the passenger.

11. The autonomous vehicle of claim 1, wherein autonomous vehicle support is automatically triggered responsive to detecting the occurrence of the type of the event.

12. The autonomous vehicle of claim 1, the acts further comprising:
   detecting an occurrence of a differing type of an event during the ride of the passenger in the autonomous vehicle based on the sensor signal outputted by the sensor system; and
   responsive to detecting the occurrence of the differing type of the event, causing the speaker to output a differing audible support message that is contextually relevant to the differing type of the event.

13. A method, comprising:
   detecting an occurrence of a type of an event during a ride of a passenger in an autonomous vehicle based on a sensor signal outputted by a sensor system of the autonomous vehicle, wherein the type of the event is predefined as potentially causing passenger discomfort;
   responsive to detecting the occurrence of the event, causing a speaker in the autonomous vehicle to output an audible support message that is contextually relevant to the type of event, wherein the audible support message solicits feedback from the passenger of the autonomous vehicle; and
   responsive to receiving the feedback from the passenger, controlling at least one of a vehicle propulsion system of the autonomous vehicle, a braking system of the autonomous vehicle, or a steering system of the autonomous vehicle based on the feedback.

14. The method of claim 13, further comprising:
selecting the audible support message based on the type of the event, wherein the audible support message is a predefined support message specified as being relevant to the type of the event.

15. The method of claim 13, further comprising:
responsive to receiving the feedback from the passenger, causing the speaker to output an audible response support message, wherein content of the audible response support message is based on content of the feedback from the passenger.

16. The method of claim 13, further comprising:
responsive to receiving the feedback from the passenger, establishing a voice communication channel between the autonomous vehicle and an interface device operated by a support agent.

17. The method of claim 13, wherein the speaker is caused to output the audible support message based on a profile of the passenger, and wherein the profile of the passenger specifies that autonomous vehicle support for the passenger is to be effectuated using audible communication.

18. A mobile computing device, comprising:
a speaker and a microphone configured for use by a user of the mobile computing device;
a processor in communication with the speaker and the microphone; and
memory that stores computer-executable instructions that, when executed by the processor, cause the processor to perform acts comprising:
receiving data from an autonomous vehicle specifying an audible support message to be presented to the user, wherein the user is a passenger in the autonomous vehicle, wherein the audible support message is contextually relevant to a type of an event being detected by the autonomous vehicle based upon a sensor signal generated by a sensor system of the autonomous vehicle, wherein the audible support message solicits feedback from the user; and
responsive to receiving the data, presenting the audible support message by way of the speaker.

19. The mobile computing device of claim 18, the acts further comprising:
responsive to presenting the audible support message, receiving vocal feedback from the user by way of the microphone; and
responsive to receiving the vocal feedback from the user, transmitting the vocal feedback from the user to the autonomous vehicle.

20. The mobile computing device of claim 18, the acts further comprising:
responsive to presenting the audible support message, receiving vocal feedback from the user by way of the microphone; and
responsive to receiving the vocal feedback from the user, establishing a voice communication channel between the mobile computing device and an interface device operated by a support agent.

* * * * *